United States Patent
Amano

(10) Patent No.: US 7,701,102 B2
(45) Date of Patent: Apr. 20, 2010

(54) ELECTRIC MOTOR STATOR

(75) Inventor: Ryuichiro Amano, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 1002 days.

(21) Appl. No.: 10/577,066

(22) PCT Filed: Feb. 2, 2005

(86) PCT No.: PCT/JP2005/001507

§ 371 (c)(1),
(2), (4) Date: Apr. 24, 2006

(87) PCT Pub. No.: WO2005/076436

PCT Pub. Date: Aug. 18, 2005

(65) Prior Publication Data

US 2009/0102307 A1      Apr. 23, 2009

(30) Foreign Application Priority Data

Feb. 6, 2004    (JP)  .............................. 2004-030264

(51) Int. Cl.
H02K 1/00  (2006.01)
H02K 3/00  (2006.01)
(52) U.S. Cl. .................................................... 310/179
(58) Field of Classification Search ................ 310/179, 310/178, 195
See application file for complete search history.

(56) References Cited

FOREIGN PATENT DOCUMENTS

| JP | 2001-218407 | A |   | 8/2001 |
|----|-------------|---|---|--------|
| JP | 2002-101596 | A |   | 4/2002 |
| JP | 2002-186203 | A |   | 6/2002 |
| JP | 2003/134716 |   | * | 5/2003 |
| JP | 2003-134716 | A |   | 5/2003 |
| JP | 2003-164089 | A |   | 6/2003 |

* cited by examiner

*Primary Examiner*—Quyen Leung
*Assistant Examiner*—Leda Pham
(74) *Attorney, Agent, or Firm*—Global IP Counselors

(57) ABSTRACT

An electric motor stator has a stator core and a plurality of windings wound around teeth of the stator core. Each of the windings has two tooth winding portions with a crossover wire extending therebetween. Each of the windings starts from a neutral wire and winds around a first tooth to form a first tooth winding portion and then winds around an opposed tooth to form a second tooth winding portion with the crossover wire extending as a power wire. Thus, the second tooth winding portion is started from the power wire. A terminal end of the second tooth winding portion is drawn out and connected to the neutral wire. The stator core has an insulator having support portions for preventing the tooth winding portions from falling outwards. The power wire is held between the tooth winding portion and a slot bottom so as to be fixed.

6 Claims, 4 Drawing Sheets

ELECTRIC MOTOR STATOR

TECHNICAL FIELD

The present invention relates to electric motor stators.

BACKGROUND ART

An electric motor has a stator and a rotor which is rotatably placed in the stator. Conventionally, there is an electric motor whose stator has a stator core having a plurality of teeth and windings wound around the teeth of the stator core via insulators. The electric motor of this type is used as a motor for a compressor of an air conditioner and so on.

Windings are wound around the teeth. At this time, in order to insulate a crossover wire of each winding, an insulating tube, an insulating sleeve or the like is required. In an attempt to dispense with the insulating tube and so on, there is known a stator having insulators in a stator core that are provided with grooves in which the crossover wires are housed, so that contact of the crossover wires of one phase with the crossover wires of the other phases is prevented (e.g., see JP 2002-101596 A).

However, in a 6-slot concentrated winding stator, since the same phases are positioned 180 degrees opposite to each other, the length of a winding that runs without being wound increases, causing deterioration of winding workability at the time of wire connection. Moreover, a power wire of a winding of one phase is likely to be brought into contact with tooth winding portions of other phases.

SUMMARY OF THE INVENTION

The present invention was made in order to solve the above conventional drawback, and an object of the present invention is to provide an electric motor stator that can prevent a power wire of a winding of one phase from being brought into contact with windings of other phases so as to have high quality and that offers superior assembling workability.

An electric motor stator, according to the present invention, comprises a stator core having a plurality of teeth and slots, each slot being formed between circumferentially adjacent teeth; and windings, a part of each winding being wound around teeth of the stator core. And, each winding includes tooth winding portions, a neutral wire, a crossover wire, and a power wire. The winding is wound around one of two opposed teeth, starting at an end of one tooth winding portion that follows the neutral wire, and the crossover wire directed from another end of the tooth winding portion around the one tooth toward the other of the opposed teeth connects to the power wire, and at an end of a tooth winding portion to be around the other tooth that continues from the power wire the winding is wound around the other tooth, and another end of the tooth winding portion around the other tooth is connected to the neutral wire. The electric motor stator further comprises an insulator having support portions that are placed at a bottom of the respective slots to prevent the tooth winding portions from falling radially outwards, and the power wire is held between the tooth winding portion and the insulator so as to be fixed.

In the electric motor stator with the above construction, since the power wire serving as a crossover wire between the opposed teeth is held between the tooth winding portion and the insulator so as to be fixed, it is possible to perform wiring without wobbling of the power wire. Moreover, a complicated arrangement for fixing the power wire is not required. Furthermore, the support portion of the insulator can prevent the winding from falling outwards, which enables the wiring to be wound in a stable state, and also this stable winding state can be maintained.

In one embodiment, the insulator is provided with a wiring separator to keep the power wire and the neutral wire spaced from each other by a predetermined distance.

In the above embodiment, because the insulator is provided with the wiring separator for keeping the predetermined distance between the power wire and the neutral wire, it is possible to prevent the power wire from being brought into contact with the neutral wire. Moreover, wiring can be surely performed such that the power wire is not brought into contact with the neutral wire in the winding operation.

DETAILED DESCRIPTION OF THE INVENTION

Figure 1:
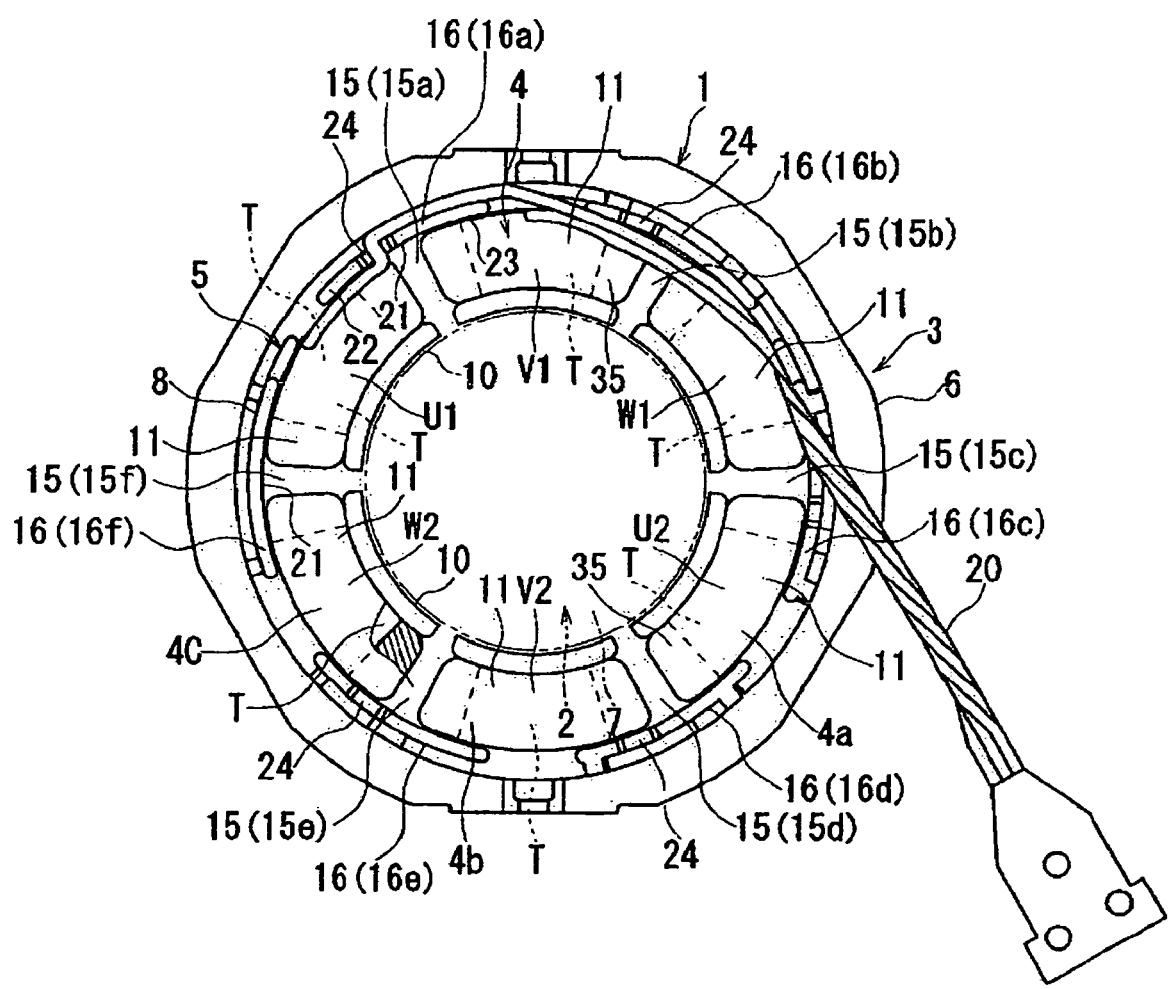
FIG. 1 is a plan view of an electric motor stator according to the present invention.

Next, a specific embodiment of an electric motor stator according to the present invention will be described below with reference to the drawings. FIG. 1 is a simplified view of essential parts of a motor in which the stator is used. The motor is constituted mainly of the stator 1 and a rotor 2 which is rotatably fitted in the stator 1. The stator 1 has a stator core 3 and windings 4 wound on the stator core 3. The stator core 3 has a core main body 6 formed by stacking a large number of annular-shaped thin plates made of electromagnetic steel and insulators (insulating members) 5, 5 provided on axial end surfaces of the core main body 6 (see FIGS. 1 to 3). The stator core 3 is provided with a plurality of teeth T (six in this case) at a predetermined pitch along a circumferential direction thereof. The windings 4 are wound on the respective teeth T. At this time, slots 15 are formed between adjacent teeth T along the circumferential direction. There are six slots 15 in this case, i.e., from a first slot 15a to a sixth slot 15f.

The rotor 2 has a rotor core 7 and a plurality of magnets (not shown) embedded in the rotor core 7. A shaft (not shown) is inserted through and fixed by an axial hole of the rotor core 7. In this case, the rotor core 7 is formed by stacking a large number of annular-shaped thin plates made of electromagnetic steel.

Figure 2:
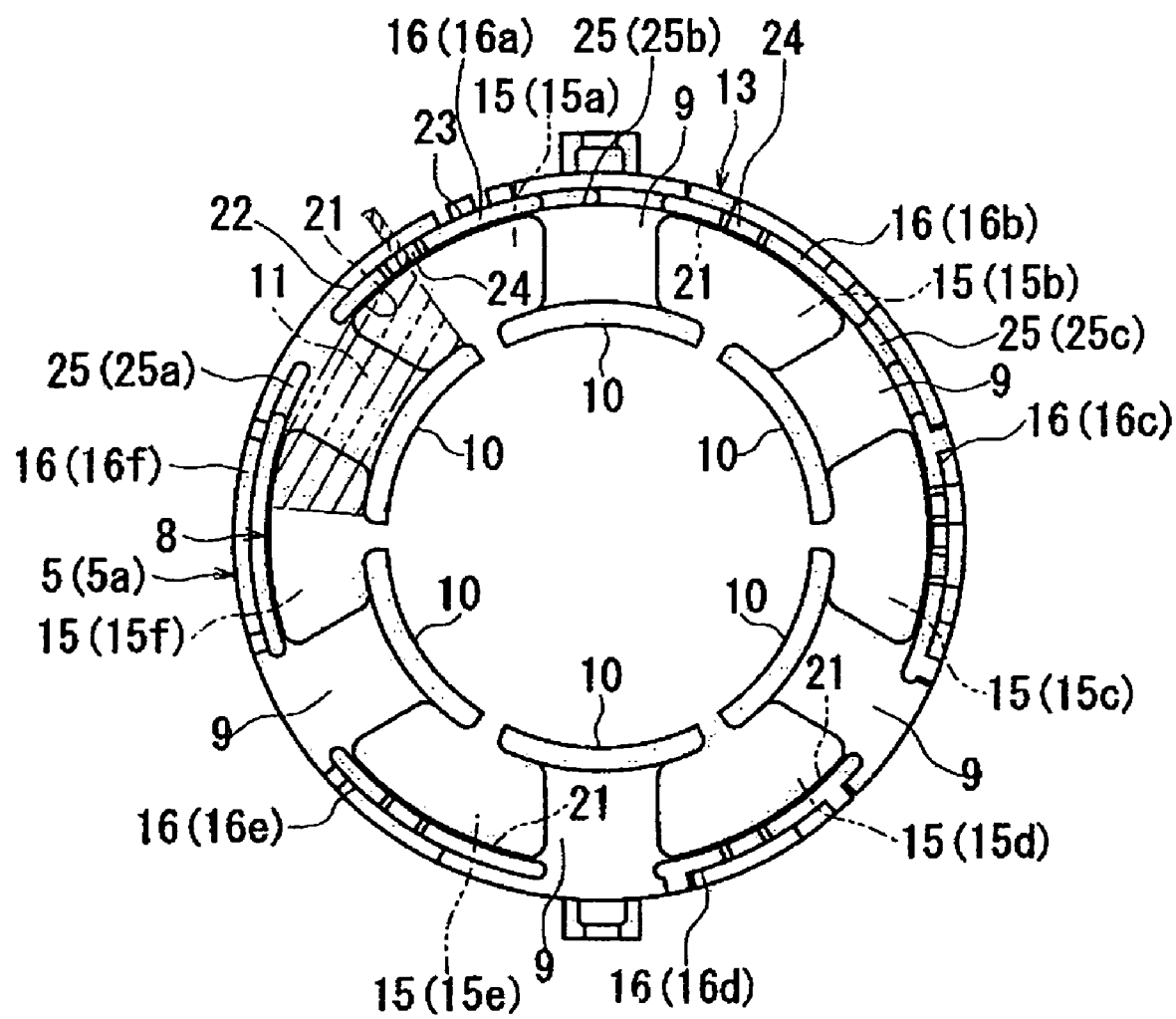
FIG. 2 is a plan view of an insulator of the stator.

As shown in FIG. 2, each of the insulators 5 includes a peripheral wall 8, a plurality of radially internally protruding portions 9 protruding from the peripheral wall 8, and raised portions 10 provided at an end edge of the radially internally protruding portions 9 to face the peripheral wall 8. The radially internally protruding portions 9 are arranged circumferentially at a predetermined pitch (at a pitch of 60°). One insulator 5 (5a) is fitted on one axial end surface of the core body 6, while the other insulator 5 (5b) is fitted on the other end surface of the core body 6.

Figure 4:
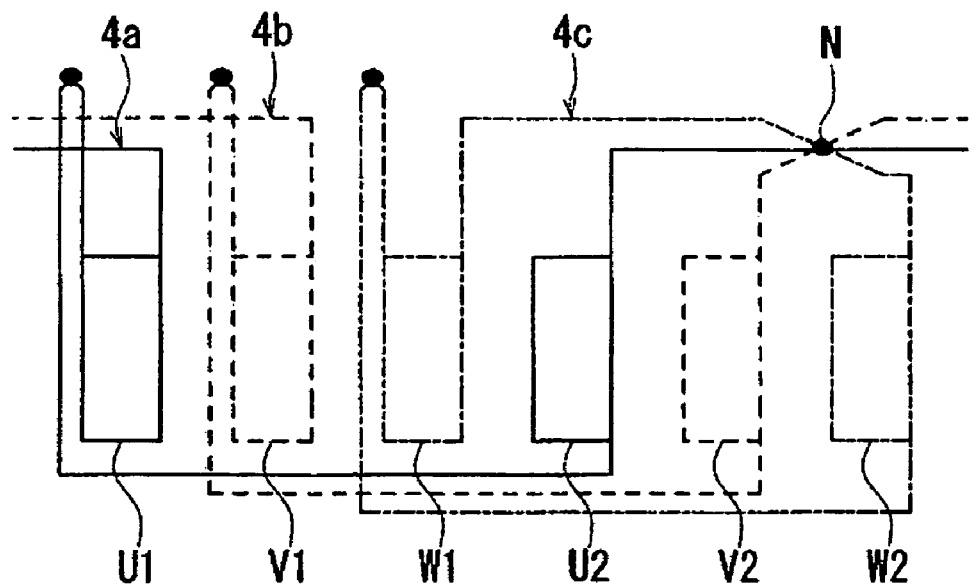
FIG. 4 is a circuit diagram showing a state of connection of windings of the stator.

The windings 4 consist of a U-phase winding 4a, a V-phase winding 4b and a W-phase winding 4c as shown in FIG. 4. The U-phase winding 4a has a first magnetic pole portion U1 and a second magnetic pole portion U2; the V-phase winding 4b has a first magnetic pole portion V1 and a second magnetic pole portion V2; and the W-phase winding 4c has a first magnetic pole portion W1 and a second magnetic pole portion W2. The U-phase winding 4a, the V-phase winding 4b and the W-phase winding 4c are connected to one another via a neutral point N. At this time, as shown in FIG. 1, the first magnetic pole portion U1 and the second magnetic pole portion U2 of the U-phase winding 4a are placed in such a manner as to be symmetrical with each other with respect to a central axis of the stator core 3 so that they are opposite to each other; the first magnetic pole portion V1 and the second magnetic pole portion V2 of the V-phase winding 4b are placed in such a manner as to be symmetrical with each other with respect to the central axis of the stator core 3 so that they are opposite to each other; and the first magnetic pole portion W1 and the second magnetic pole portion W2 of the W-phase winding 4c are placed in such a manner as to be symmetrical with each other with respect to the central axis of the stator core 3 so that they are opposite to each other.

Figure 5:
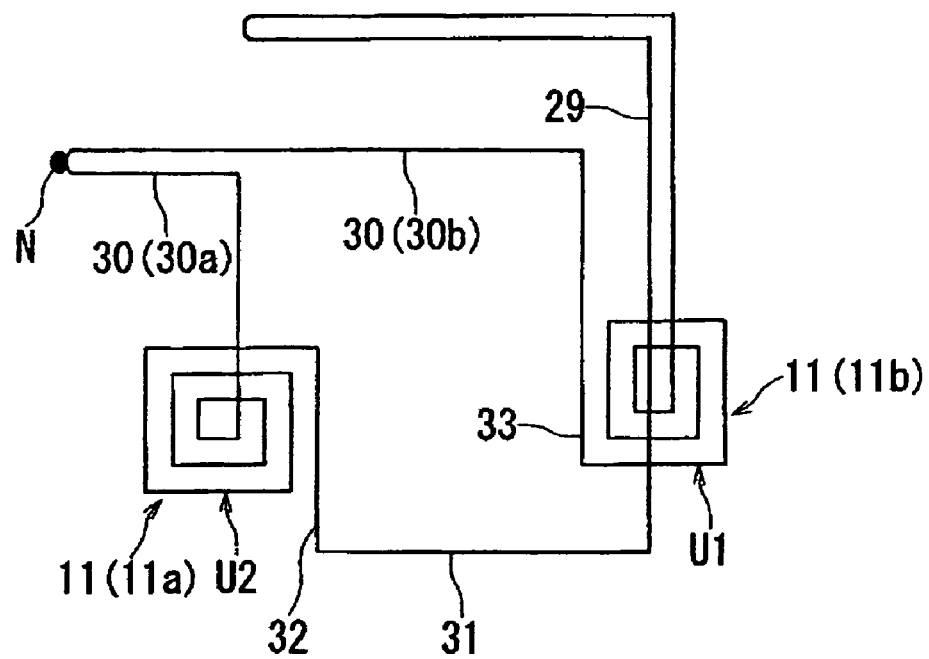
FIG. 5 is a simplified diagram for showing a winding method for the stator.

The winding method will be described in detail regarding the U-phase winding 4a. As shown in FIG. 5, a part following a neutral wire 30 of the winding is wound around one of the opposed teeth T until after a tooth winding portion 11a serving as the second magnetic pole portion U2 is provided. A crossover wire 31 to the other tooth T is extended to serve as a power wire 29. Then, a part following the power wire 29 of the winding is wound around the other tooth T until after a tooth winding portion 11b serving as the first magnetic pole portion U1 is provided. A winding end at the other tooth T is drawn out toward the neutral wire 30 so as to be connected to the neutral wire. That is, the neutral wire 30a on the winding start side of the tooth winding portion 11a serving as the second magnetic pole portion U2 is connected to a neutral wire 30b on the winding end side of the tooth winding portion 11b serving as the first magnetic pole portion U1 via the neutral point N. The same winding method as that of the U-phase winding 4a is applied to the other V-phase winding 4b and W-phase winding 4c. Therefore, the second magnetic pole portion U2, V2, W2 of each winding 4a, 4b, 4c has a lead-out portion 32 drawn out to the first magnetic pole portion U1, V1, W1, and the first magnetic pole portion U1, V1, W1 has a lead-out portion 33 drawn out to the neutral wire 30 (30b).

The power wire 29 is fixed in such a manner that it is held between the tooth winding portion 11 and a slot bottom 21 (which is an inner circumferential surface defining the slot 15). That is, as shown in FIG. 5, the power wire 29 is held between the tooth winding portion 11b that constructs the second magnetic pole portion U2, and the slot bottom 21 corresponding to the tooth winding portion 11b.

Figure 3:
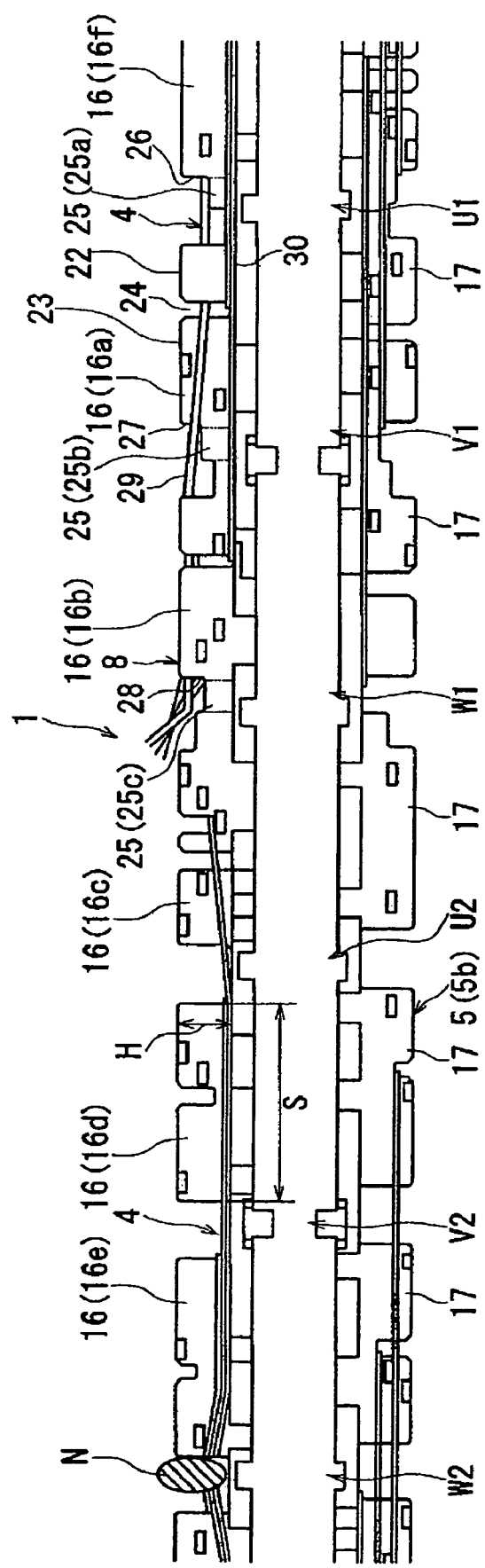
FIG. 3 is a side view of the insulators of the stator in a developed state.

Next, as shown in FIG. 3, the peripheral wall 8 has a plurality of sub-walls 16 corresponding to the respective slots 15. Of the slots, a first slot 15a corresponds to a first sub-wall 16a, a second slot 15b corresponds to a second sub-wall 16b, a third slot 15c corresponds to a third sub-wall 16c, a fourth slot 15d corresponds to a fourth sub-wall 16d, a fifth slot 15e corresponds to a fifth sub-wall 16e, and a sixth slot 16f corresponds to a sixth sub-wall 16f. The sub-walls 16 are each provided with a slit 24, and the power wires 29 are received in the respective slits 24. Specifically, the slit 24 is provided in the first sub-wall 16a, whereby the first sub-wall 16a is divided into a first wall portion 22 and a second wall portion 23. And, the power wire 29 drawn out and running along an inner surface of the sixth sub-wall 16f is then placed on an inner surface side of the first wall portion 22 of the first sub-wall 16a and then on an outer surface side of the second wall portion 23 of the first sub-wall 16a. The sub-walls 16 each constitute a support portion, which will be described later.

In this case, a wiring separator 25 (25a) that supports the power wire 29 is provided between the sixth sub-wall 16f and the first sub-wall 16a; a wiring separator 25 (25b) that also supports the power wire 29 is provided between the first sub-wall 16a and the second sub-wall 16b; and a wiring separator 25 (25c) that also supports the power wire 29 is provided between the second sub-wall 16b and the third sub-wall 16c. More specifically, a protrusion provided in a gap 26 between the sixth sub-wall 16f and the first sub-wall 16a forms the wiring separator 25a; a protrusion provided in a gap 27 between the first sub-wall 16a and the second sub-wall 16b forms the wiring separator 25b; and a protrusion provided in a gap 28 between the second sub-wall 16b and the third sub-wall 16c forms the wiring separator 25c.

Thus, the power wires 29 pass the wiring separators 25a, 25b, and 25c, so that movement of the power wires toward the neutral wires 30 is restricted by these wiring separators 25a, 25b, and 25c. Therefore, a lead wire 20 (formed by bundling the power wires 29 of the U-, V-, and W-phases) can be drawn out in a state in which contact of the power wires 29 with the neutral wires 30 provided on the outer surface side of the peripheral wall 8 of the insulator 5 is prevented. The other insulator 5b on the counter-lead wire side is also provided with sub-walls 17, but no wiring separators 25 (25a, 25b, 25c) are provided. This is because the power wires 29 are not drawn out to this insulator 5b.

Each sub-wall 16 of the insulator 5 forms a support portion for supporting a protruding portion 35 of the tooth wiring portion 11 (see FIG. 1) from its radially outer side, the protruding portion 35 being a portion that protrudes from an end surface of the stator core 3. More specifically, the sub-walls (support portion) 16 have a height (i.e., an axial length) (H) (see FIG. 3) set to be approximately equal to or slightly larger than the dimension of the protruding portion 35 of the tooth winding portion 11. Furthermore, the sub-walls (support portion) 16 have a circumferential length (S) (see FIG. 3) to accommodate the confronting circumferential edge portions of the circumferentially adjacent tooth winding portions 11, 11.

This motor (which is of permanent magnet type) is used as, for example, a motor for a compressor of an air conditioner. The compressor includes a casing, which is a sealed container, a compressor elements part housed in the lower side of the sealed container, and a motor elements part housed in the upper side of the sealed container. The permanent magnet type motor is used for the motor elements part. Therefore, a shaft that is inserted through and fixed by the axial hole of the rotor 2 is a crankshaft for the compressor elements part, and the crankshaft is supported by a supporting member within the sealed container.

In the electric motor stator, since the power wire 29 drawn out from the tooth winding portion 11 of the winding 4 is fixed by being held between the tooth winding portion 11 and the slot bottom 21, winding can be performed without wobbling of the power wire 29. Therefore, it is possible to prevent the power wire 29 from being brought into contact with tooth winding portions 11 of other phases, so that the electric motor can exhibit a stable function as the motor for a long time. Further, the protective tube, which has conventionally been used, can be dispensed with, which makes it possible to provide an improvement in assembling performance and a reduction in costs. Further, since no complicated structure or arrangement for fixing the power wire 29 is required, a further cost reduction through simplification of the structure of the stator is possible.

Since the insulator 5 is provided with the winding separators 25 that keep the power wires 29 spaced from the neutral wires 30 by a predetermined distance, it is possible to prevent the power wires 29 from being brought into contact with the neutral wires 30. Thereby, a motor with high quality can be provided. Moreover, wiring can securely be performed such that the power wires 29 are not brought into contact with the neutral wires 30 in the wiring operation, thus making it possible to contrive simplification of the wiring operation of the windings 4. That is, the provision of the winding separators 25 in the insulator 5 makes it possible to achieve stable wiring workability and improve the non-contact reliability between the power wire 29 and the neutral wire 30. Furthermore, since the insulator 5 has, on its radially outer side, the support portions formed of the sub-walls 16 of the peripheral wall 8, the tooth winding portions 11 are thereby prevented from falling outward, so that the tooth winding portions 11 can maintain their stable winding state. Consequently, simplification of the winding operation can be achieved and a stator with high quality can be provided. Further, since the insulator 5 has, on its radially inner side, the raised portions 10, it is also possible to prevent the protruding portions 35 of the tooth winding portions 11 from falling inward.

Embodiments of the invention being thus described, it will be obvious that the preset invention is not limited to those embodiments, but that same may be varied in many ways within the scope of the following claims. For example, it is possible to change the number of phases and the number of poles in the motor. The distance between the power wire 29 and the neutral wire 30 can be changed by changing the height of each protrusion forming the winding separator 25a, 25b, 25c. Furthermore, the winding separators 25a, 25b, 25c may have the same or different heights.

The invention claimed is:

1. An electric motor stator comprising:
   a stator core having a plurality of teeth and a plurality of slots with one of the slots being formed between circumferentially adjacent ones of the teeth;
   an insulator including a plurality of support portions with the support portions being disposed at bottom open ends of the slots; and
   a plurality of windings connected to a neutral wire with each of the windings including
      a first tooth winding portion wound about a first tooth of the teeth,
      a second tooth winding portion wound about a second tooth of the teeth that is radially opposed to the first tooth,
      a crossover wire, and
      a power wire with the crossover wire extending from the first tooth winding portion toward the second tooth winding portion, and with the power wire connecting the crossover wire to the second tooth winding portion with the power wire being fixedly held between a slot bottom of the stator core and the second tooth winding portion,
   the support portions of the insulator being structured to prevent the first and second tooth winding portions from falling radially off the teeth.

2. The electric motor stator according to claim 1, wherein the insulator is provided with a wiring separator to keep the power wire and the neutral wire spaced from each other by a predetermined distance.

3. The electric motor stator according to claim 1, wherein the neutral wire, the first tooth winding portion, the crossover wire, the power wire, and the second tooth winding portion of each winding defines a seamless, continuous line.

4. An electric motor stator comprising:
   a stator core having a plurality of teeth and a plurality of slots with one of the slots being formed between circumferentially adjacent ones of the teeth; and
   a plurality of windings connected to a neutral wire with each of the windings including
      a first tooth winding portion wound about a first tooth of the teeth,
      a second tooth winding portion wound about a second tooth of the teeth that is radially opposed to the first tooth,
      a crossover wire, and
      a power wire with the crossover wire extending from the first tooth winding portion toward the second tooth winding portion, and with the power wire connecting the crossover wire to the second tooth winding portion with the power wire being fixedly held between a slot bottom of the stator core and the second tooth winding portion,
   the neutral wire, the first tooth winding portion, the crossover wire, the power wire, and the second tooth winding portion defining a seamless, continuous line.

5. The electric motor stator according to claim 4, wherein the stator core including a core main body and two insulators disposed on axially opposite sides of the core main body,
each insulator includes a plurality of support portions with the support portions being disposed at bottom open ends of the slots, and
the support portions of the insulators are structured to prevent the first and second tooth winding portions from falling radially off the teeth.

6. The electric motor stator according to claim 5, wherein one of the insulators is provided with a wiring separator to keep the power wire and the neutral wire spaced from each other by a predetermined distance.

* * * * *